United States Patent [19]

Krehnovi

[11] Patent Number: 4,493,412
[45] Date of Patent: Jan. 15, 1985

[54] GLASS SHEET POSITIONING APPARATUS FOR CONVEYOR PLATFORM

[75] Inventor: Richard J. Krehnovi, Mansfield, Ohio

[73] Assignee: PPG Industries, Inc., Pittsburgh, Pa.

[21] Appl. No.: 392,393

[22] Filed: Jun. 25, 1982

[51] Int. Cl.³ .................................... B65G 47/26
[52] U.S. Cl. .................................... 198/434; 65/163; 271/236; 271/250
[58] Field of Search ............... 198/434, 382, 383, 345, 198/636; 65/163, 253, 254; 271/234, 236, 238–240, 250, 253

[56] References Cited

U.S. PATENT DOCUMENTS

| | | | |
|---|---|---|---|
| 2,572,325 | 10/1951 | Ernst | 198/636 |
| 2,761,542 | 9/1956 | Pagdin | 198/33 |
| 3,216,551 | 11/1965 | Peck | 198/33 |
| 3,218,066 | 11/1965 | Halberschmidt et al. | 271/57 |
| 3,498,441 | 3/1970 | Furedy et al. | 198/29 |
| 3,638,564 | 2/1972 | Prange et al. | 198/434 |
| 3,701,643 | 10/1972 | Frank | 65/62 |
| 3,992,182 | 11/1976 | Frank | 65/163 |
| 4,064,659 | 12/1977 | Ulivi | 198/345 |
| 4,200,420 | 4/1980 | Cathers et al. | 414/107 |
| 4,228,993 | 10/1980 | Cathers | 271/236 |
| 4,293,124 | 10/1981 | Bailey et al. | 271/238 |

Primary Examiner—Joseph E. Valenza
Assistant Examiner—Kyle E. Shane
Attorney, Agent, or Firm—Donald C. Lepiane; Robert A. Westerlund, Jr.

[57] ABSTRACT

Horizontally conveyed flat glass articles are halted and oriented in a precise location. Vertical stop pins removably affixed to a table attached to one end of the apparatus arrest the leading edge of the moving article whereupon pins removably mounted in a pair of transversely movable tables advance toward the article substantially normal to its arrival direction, thus engaging the edges of the article and orienting it in a vise-like manner. Lastly, adjustable pins mounted in a vertically and longitudinally moving table engage the trailing edge of the article and urge it toward the stop pins, thus orienting and aligning the article in a precise position relative to a fixed reference point. The apparatus is particularly adapted to the precise orientation and alignment of pattern cut sheets of glass to be removed from a conveyor platform by a robot.

8 Claims, 7 Drawing Figures

GLASS SHEET POSITIONING APPARATUS FOR CONVEYOR PLATFORM

BACKGROUND OF THE INVENTION

1. Field of the Invention

This invention relates to orienting and positioning flat glass articles and, in particular, to the precise positioning of pattern cut pieces of glass within the tolerances necessary for a robot to locate the articles and remove them from the conveyor platform.

2. Description of the Technical Difficulties

The art of handling glass sheets teaches frames and mechanisms generally involving vacuum cups for transferring glass sheets from a conveyor or stack to a stack or conveyor, respectively. Some handling patents of that type disclose sheet orienting as well. In U.S. Pat. No. 4,200,420 a sheet orienting and transporting frame is disclosed which orients and transports sheets. U.S. Pat. No. 4,228,993 teaches a sheet orienting and transporting frame having slidable dogs mounted on an elongated arm for orienting the sheet and vacuum cups for transporting the oriented sheet.

There are patents which disclose positioning sheets on a moving conveyor. U.S. Pat. No. 3,498,441 discloses one such positioning device for conveyed articles in which a shaft mounted transversely over the conveyor belt provides a plurality of positioning fingers depending therefrom and positions the articles while the conveyor is in motion. U.S. Pat. No. 3,701,643 discloses a moving locating device for aligning and orienting moving glass sheets which includes a mechanism to move the glass in a direction transverse to the path of movement. U.S. Pat. No. 3,761,542 teaches conveyor apparatus with electrically actuated article orienting means to orient an article as it travels down a conveyor.

Moving end stops for handling sheets are disclosed wherein the end stops move into and out of the way to stop an advancing sheet. U.S. Pat. No. 3,218,066 discloses a process and apparatus for handling sheets of glass which provides moving end stops at a point relative to the glass sheet. U.S. Pat. No. 4,064,659 provides movable end stops on an apparatus for centering sheets of glass on a platform of a machine in which the sheet of glass is centered by a plurality of movable pins around the periphery of the sheet.

A further type of article orienting apparatus is disclosed in U.S. Pat. No. 3,216,551 in which an apparatus is provided for orienting articles which senses incorrect orientation and then actuates an overhead rotation mechanism having depending members which, in turn, rotate the article.

With the advent of industrial robots, and in particular the semi and fully articulated type, it has been found that much human manipulation of articles in manufacturing can be eliminated. Robots are well suited for the performance of a variety of dangerous or repetitive tasks. One such task, for example, is the lifting of articles such as pattern cut pieces of flat glass from a conveyor table and the placing of those articles in precise register with one or more glass edging machines. In order to accomplish the precise placement of the glass article in the glass edging machine, it is necessary that the article be presented to the robot, aligned, oriented and placed in a particular location. The exact article location can then be programmed into the robot controller. If each succeeding article is presented to the robot in precisely the same location and in the same orientation, the robot will be able to consistently perform its function of transferring the article to the glass edging machine.

Articles being presented to the robot often vary in size and shape as different products are constantly being produced. It would thus be necessary to reprogram the robot to provide a new reference point to which all succeeding articles of a particular type are positioned and oriented. One way to provide such a precise reference point is to unload the conveyor by a human worker who then places the articles in a specific location. Unfortunately, the exact placement by a human worker negates the advantage of using the robot.

Another possibility of article presentment would be to use existing devices for orienting articles moving on a conveyor, however; none of those devices provide sufficient precision of location and orientation. Those devices also use movable stop means and/or position the article "on the fly" while traveling along the conveyor thus creating the possibility for error. The article must be presented to the robot in the same precise location within 0.05 inches in any direction. The cost of providing a robot and robot program to so precisely locate different sized articles moving on a conveyor also negates the advantage of the robot.

In order to utilize a robot effectively, the robot arm must be provided with a free path to travel above the pick up point. The prior art devices generally rely upon carriages and transverse bridges with depending fingers to align the article on a conveyor. It would be difficult, if not impossible, to use such an alignment device that projected above the conveyor platform or workpiece, as the robot would not be able to avoid the alignment device.

Accordingly, it would be most advantageous to provide a conveyor platform glass sheet positioning apparatus which would allow precise positioning of various sized articles, while not having any of its operating parts above the platform to interfere with the movement of the robot arm. Furthermore, it would be advantageous to provide such a positioning apparatus which would be easily adjustable to different shaped and sized sheet glass articles. Such an apparatus should totally stop the article prior to robot pick up, be capable of positioning different shaped and sized articles, not interfere with robot removal, and should be easily adapted to conventional conveyors. The instant invention is directed toward all of these needs.

SUMMARY OF THE INVENTION

According to the present invention, an apparatus is provided for precisely positioning and orienting a flat glass article, and in particular, a pattern cut glass article. Rectangular and square sheets of flat glass and articles of bent and shaped glass can also be accurately and precisely positioned. The invention provides such a positioning apparatus for installation primarily on a roll type conveyor.

The invention provides an end stop for stopping the article, a sheet sensor that senses that the article has been stopped, and a timer for actuating a delayed stopping of the conveyor device mechanism. Once the conveying mechanism upon which the article rests is stopped, the article is "squared" or oriented by the movement of right side pins moving transversely to the direction of travel that the article took on the conveyor. Then the article is precisely aligned transversely by left side pins moving toward the right side pins. In order to further insure that the article is totally aligned, the invention provides for a further step of urging pins against the trailing edge of the article to place it in total register with the stop pins as well as the side alignment pins. An additional pin retraction step is provided to allow the robot to pick up the article without damaging the edges. Thus, a sequence of steps is provided for sensing the article, stopping the article, stopping the conveying mechanism, urging alignment pins against the transverse edges of the article, raising pins behind the trailing edge of the article, urging them against the stop pins and retracting all except the stop pins. The conveying mechanism is started upon removal of the article.

The apparatus of the invention is provided with a fixed stop table having an array of precisely aligned holes which receive adjustable stop pins of which one end of the stop pin projects slightly above the plane of the top roll or conveyor surface. The stop pins are adjustably bolted to the stop table and have protective bumper caps.

Transversely moving side tables are provided with a similar array of holes for removably mounting vertical drop pins which also project slightly above the plane of the top roll. The side tables move in a transverse direction so that when the pins are placed in the appropriate holes in the table, the actuation of the transverse tables will squeeze the article in a vise-like manner. The side tables are provided with a vernier adjustment mechanism which in conjunction with the hole matrix, provides a wide range of adjustment. The side table pins have protective bumper caps.

The pins which urge against the trailing edge of the article are constructed similarly to the end stop pins, however, the table in which they are adjustably bolted also moves in both a vertical direction and in a longitudinal direction.

When the glass is being conveyed across the platform, the trailing edge table is in a lowered position so that the trailing edge alignment pins are not projecting above the top plane of the conveyor platform. Once the article has been sensed and then halted by the end stop pins, and the conveyor mechanism has stopped, the transverse alignment tables are actuated in sequence or in unison. Thereafter, the trailing edge table raises vertically, thus projecting the trailing edge alignment pins slightly above the plane of the conveyor platform. The trailing edge platform is then urged toward the end stop platform, thus longitudinally squeezing the article between the alignment pins of the trailing edge table and the end stop pins of the stop table.

The transversely moving side tables, as well as the longitudinally and vertically moving trailing edge table is actuated by power cylinders. Either air or hydraulic power cylinders could be employed and even electrical drive means could be used within the scope of this invention.

The alignment and orienting mechanism as well as the mechanism for adjusting the alignment table is located beneath and off to the side of the conveyor platform. The invention thus provides a clear path for the manipulator arm of a robot so that the robot may lift the articles from the conveyor and not strike any part of the apparatus and the apparatus may be adjusted for different sized articles from one side of the conveyor platform.

BRIEF DESCRIPTION OF THE DRAWINGS

Other specific features and advantages of the invention will become apparent from the following description of the preferred embodiments thereof in conjunction with the drawings in which.

DESCRIPTION OF THE PREFERRED EMBODIMENT

Figure 1:
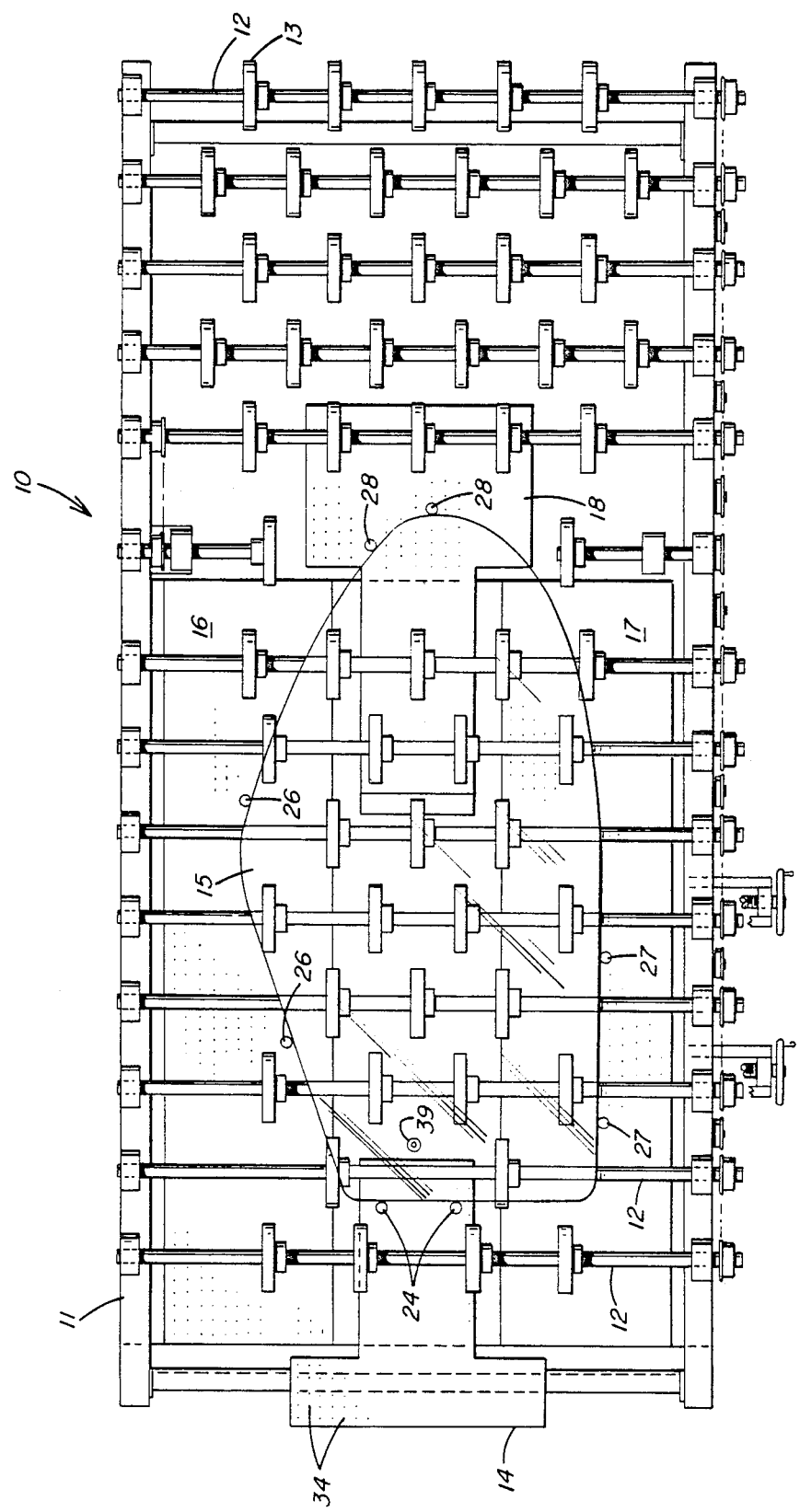
FIG. 1 is a top plan view of the overall apparatus with a pattern cut sheet of glass in position.

Referring now to FIG. 1 where the invention 10 is depicted from an overhead view with workpiece 15 situated on top thereof. The apparatus 10 generally includes a conventional frame 11 for conveyor tables of the type having a plurality of roller axles 12 upon which are mounted a plurality of wheels 13 known as "rolls" or "donut rolls". The roll type conveyor is generally electrically driven in a manner well known in the art. Axles 12 are driven by the use of a belt of chain or other mechanism so as to rotate about their longitudinal axis, thus imparting a similar motion to rolls 13 which are affixed to axles 12. Axles 12 and rolls 13 all revolve in the same direction. This can best be illustrated by examining FIG. 3 in which it can be seen that if all depicted rolls rotated counterclockwise, the article 15 placed upon the conveyor would move from right to left, whereas if all the rolls 13 upon which article 15 is placed rotate clockwise, article 15 would move from left to right. When the drive mechanism for the roll conveyor is actuated so that the rolls revolve in a counterclockwise direction as depicted in FIG. 3, thus conveying an article 15 from right to left, the article 15 would travel off the roll conveyor unless it lodged against a stop.

Figure 4:
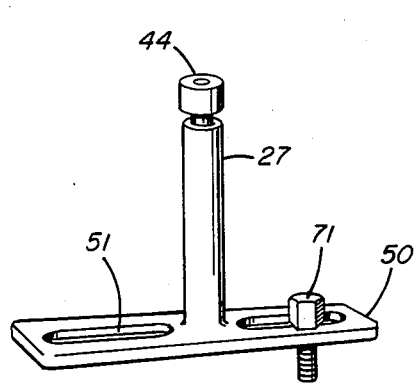
FIG. 4 is a perspective view of a pin and support for the end stop table or the trailing edge table.
Figure 5:
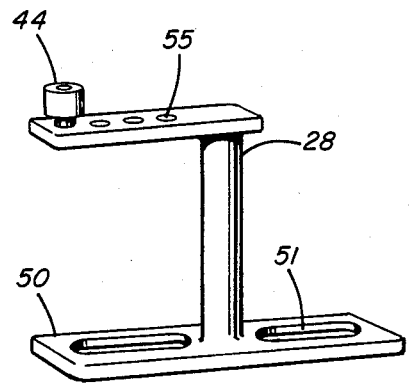
FIG. 5 is a perspective view of a pin and support for the end stop table or trailing edge table; the pin being of a different type from that shown in FIG. 4.

Referring now to FIG. 1 wherein it can be seen that article 15 is resting against leading edge stop pins 24. Leading edge stop pins 24 are bolted to end stop table 14 in a manner as depicted in FIGS. 1 and 3. As seen in FIG. 2, end stop table 14 is provided with an array of holes 34 which coact with the slotted bolt opening 51 as shown in FIG. 4. Leading edge stop table 14 is affixed to frame 11 beneath the plane of the rolls as shown in FIG. 3, and leading edge stop pins 24, are attached to table 14 in a manner previously discussed. Horizontal stop table 14 is a flat, horizontal plate having a T-planform. Leading edge stop table 14 is provided with holes 34 which allow the stop pins depicted in FIGS. 4, 5 or 7 to be bolted to the top table surface 14 so that bumper cap 44 extends above the top tangential point of rolls 13 into the path of article 15.

Figures 2, 3:
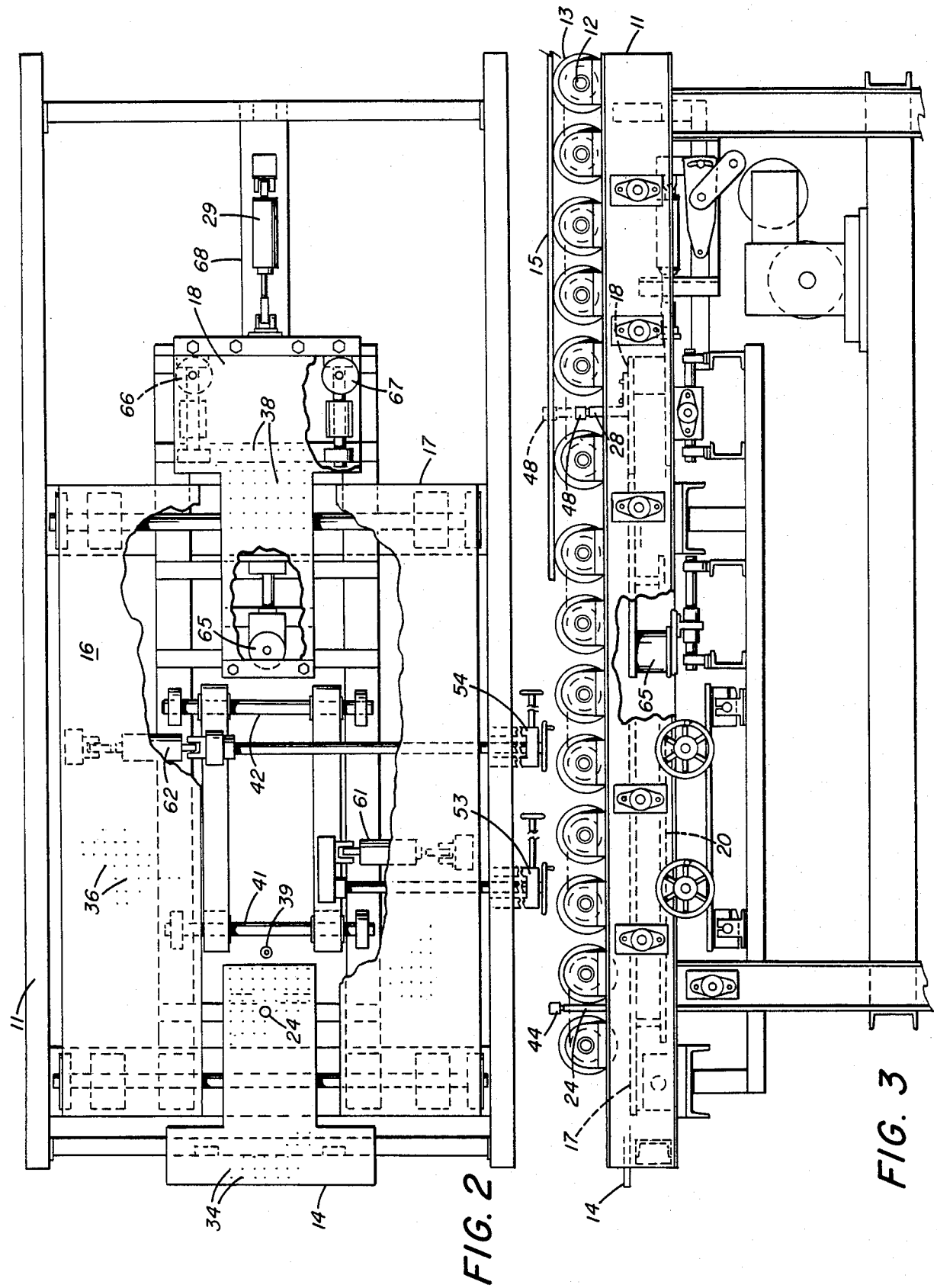
FIG. 2 is a top plan view of the apparatus in which the conveyor rolls and associated mechanism have been removed to show the fixed and movable tables. The table plates have been cut away to reveal suspension and adjustment systems.
FIG. 3 is a right side elevational view of the overall apparatus wherein selected portions have been cut away to reveal suspension and actuating systems.

Referring now to FIG. 3, where it is shown that leading edge stop pin 24 is placed between the roller axles 12, as shown in FIG. 1, in a manner so that the top cap portion 44 impedes the progress of any sheet article being conveyed down the conveyor platform. Leading edge stop pins 24 are provided with a nylon cap or sheath which avoids metal to glass contact, thus preserving the edge of workpiece 15. It can be seen in FIG. 1 that workpiece 15 rests against leading edge stop pin cap 44 and that leading edge stop pin cap 44 barely extends above the plane of workpiece 15 as shown in FIG. 3. The pin cap 44 extends approximately one half inch above the roll top plane, but could be modified in vertical extension to accommodate different thicknesses of sheets or edges of bent and shaped articles.

Figure 6:
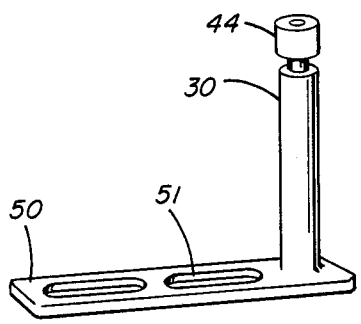
FIG. 6 is a detailed view of the side drop pin as utilized transversely moving tables wherein the table is shown in section.

Rectangular side tables 16 and 17 as shown in FIG. 2 are constructed of two parallel plates each having aligned holes 36 in a matrix as depicted in FIG. 2. Holes 36 are provided so that the right side drop pin 26 and left side drop pin 27, as shown in FIGS. 1 and 6, will project through holes 36 thus removably securing pins 26 and 27 in the appropriate location to accommodate different sized workpieces 15.

Trailing edge table 18 as can be seen in FIG. 2, has a T-shaped planform similar to leading edge stop table 14 and is similarly constructed of a horizontal plate having a large matrix or array of holes 38 disposed therein. Trailing edge pins 28 are bolted or otherwise secured to trailing edge table 18 in a manner to that discussed in relationship to leading edge stop table 14 and stop pins 24.

Right side table 16 and left side table 17 are horizontally slidably attached to the frame 11 of the conveyor by means of rails 41 and 42 as shown in FIG. 2. FIG. 2 also depicts vernier adjustment 53 and 54 for moving right side table 16 and left side table 17 toward the center of the table and away from the table through the full range of movement. It is to be understood that side drop pins 26 and 27, when placed in right side table 16 or left side table 17, respectively, will advance towards the center when side tables 16 and 17 are moved toward the center. Actuating cylinders 61 and 62 move the side tables 16 and 17 from the outside position to the centermost position as depicted in FIG. 2.

Trailing edge table 18 is movably attached to frame 11 by means of pillow blocks 64 and pancake air cylinders 65, 66 and 67, as well as by longitudinally actuating trailing edge cylinder 29 which is removably mounted to rails 68. Pancake cylinders 65, 66 and 67 operate to lift trailing edge table 18 in a vertical direction so that trailing edge pins 28 extend nylon cap 48 above the top plane of the roller conveyor and thereby are in vertical position to come into contact with workpiece 15. By actuating power cylinder 29, trailing edge table 18 advances toward the leading edge step table 14 as shown in FIG. 2 by the dashed outline, thus advancing trailing edge pins 28 toward the workpiece.

The operation of the invention will now be described. When a workpiece 15 enters on the conveyor rolling from right to left as shown in FIG. 1, it passes over trailing edge table pins 28 since initially trailing edge table 18 is in a lowered position and the side tables 16 and 17 are in a retracted position apart from each other. As previously mentioned, leading edge stop table 14 is provided with a sensing mechanism 39 which is a limit switch or other switching device placed in the path of the oncoming workpiece in such a manner that it is actuated when the workpiece has arrived and actuated when the workpiece is no longer present. The switch sensor could be a limit switch having a flexible actuating rod (wand) which implinges against the underside of the glass when the workpiece is in place, thereby closing the switch and conversely, when the glass workpiece is removed, the switch is thereby opened.

As the workpiece enters and actuates the sensing switch 39, a timer (not shown) is actuated. Meanwhile, the conveyor rolls 13 continue to drive the workpiece 15 against leading edge stops 24. After a sufficient period of time has elapsed the conveyor drive mechanism is shut off by the timer and rolls 13 stop moving. The timer is sequenced to then actuate transverse air cylinders 61 and 62, thereby driving side tables 16 and 17 toward each other thus squeezing and orienting workpiece 15 between the top of right side drop pins 26 and left side drop pins 27. The side tables may be actuated one after the other, or in unison. At this point, workpiece 15 may roll along end caps 44 of leading stop pins 24 to arrive in position. The rolls 13 are made of a material such as Teflon or are a brush construction to limit surface marring. The timer then actuates pancake air cylinders 65, 66 and 67 which raise trailing edge table 18 thus placing trailing edge cap 48 in the plane of workpiece 15 as shown in FIG. 3 by dashed lines. The timer then actuates longitudinal cylinder 29, thus driving trailing edge table 18 toward the workpiece and squeezing the workpiece 15 between leading edge stop pins 24 and trailing edge pins 28 being contacted on caps 44 and 48 of pins 24 and 28, respectively. Roller caps 46 on pins 26 and caps 47 on pins 27 may roll against the workpiece edge while the workpiece is being urged by trailing edge pins 28 against leading edge stop pins 24.

With the workpiece 15 in position as depicted in FIGS. 1 and 3, the precise location of the workpiece may be programmed into the robot controller by "walk through" or other methods, thus enabling the robot to pick up the workpiece from the conveyor and move it to a different location for performing other work on the article.

The original set up is accomplished by programming the robot to a precise center line location. Thereafter, succeeding articles of varying sizes and shapes can be positioned to the same centerline by adjusting the apparatus 10 rather than by reprogramming the robot controller.

Figure 7:
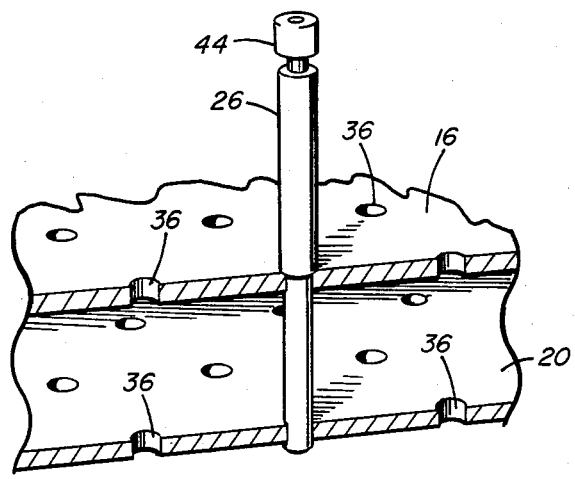
FIG. 7 is a perspective view of a different type of adjustable pin utilized on the stop table as well as trailing edge table.

The adjustment of the apparatus 10 is usually accomplished by use of a template (not shown) and can be set up on the left side by placing a template or workpiece in position over the longitudinal and transverse centerline previously used. End stop pins 24 in end stop table 14 are repositioned by the use of bolts and elongate holes 51 as shown in FIGS. 4 and 7.

A bar (not shown) could also be used instead of the depicted pins. If a bar were used, it is contemplated that the bar could be "T" shaped and would be useful for stopping an article having a curved or pointed leading edge. The bar could also be used on the other tables as well.

If the robot does not pick up the workpiece 15 exactly vertically, the edges of the workpiece 15 may become damaged. For this reason the timer sequences to actuate power cylinders 61 and 62 for side tables 16 and 17 and power cylinder 29 for trailing edge table 18, thus leaving workpiece 15 in the same position to be picked up by the robot at this point, the edges of the workpiece are separated in space from the retracted pins thereby not causing damage to the edges of the workpiece. The conveyor mechanism remains stopped. The timer sequences once more and lowers the trailing edge table 18, thus placing trailing edge pins 28 including end caps 48 below the top plane of the conveyor rolls. Once the robot removes the workpiece 15, sensor 39 is actuated thus starting the conveyor roll and sending a signal to the robot controller that there is no workpiece yet on the conveyor platform. Another workpiece arrives on the conveyor and the sequence is repeated.

It has been discovered that the entire readjustment of the apparatus for a different sized and shaped articles only requires one man and can be performed without reprogramming the robot. The apparatus positions articles to within ±0.005 of an inch which is well within the ±0.050 tolerance of the robot.

The apparatus could also be used to position articles for automated inspection or for other processes other than for removal to a glass edging machine, and it is understood that the preferred embodiments are but the preferred apparatus for providing all objects and advantages previously discussed. It should thus be understood that modifications other than those specifically mentioned will become apparent to those of ordinary skill in the art after reading this disclosure. Therefore, the above specification is to be considered exemplary and not limitative, the scope of this invention being defined by the attendant claims.

I claim:

1. An apparatus for positioning a sheet in a predetermined location in a sheet pick-up station located on a platform, comprising:
   a plurality of sheet engaging means;
   stopping means disposed about one end of the sheet pick-up station for stopping the sheet in the sheet pick-up station;
   a first table disposed on one side of the sheet pick-up station, said first table having holes arranged in a plurality of rows and columns for receiving at least one of said sheet engaging means;
   a first means for reciprocating said first table between a sheet engaging position wherein at least one of said said sheet engaging means engages a side edge of the sheet on the platform, and a non-sheet engaging position;
   a second table disposed on the opposite side of the sheet pick-up station, said second table having holes arranged in a plurality of rows and columns for receiving at least one of said sheet engaging means;
   a second means for reciprocating said second table between a sheet engaging position wherein at least one of said sheet engaging means engages the opposite side edge of the sheet on the platform, and a non-sheet engaging position;
   a third table disposed about the opposite end of the sheet pick-up station, said third table having holes arranged in a plurality of rows and columns for receiving at least one of said sheet engaging means;
   a third means for reciprocating said third table vertically upwardly and downwardly relative to the platform, between a first position wherein said third table and said at least one of said sheet engaging means carried thereby are disposed below the plane of the platform, and a second position wherein said at least one of said sheet engaging means carried by said third table at least partially projects above the plane of the platform;
   a fourth means for reciprocating said third table, when it is in its said second position, between a sheet engaging position wherein at least one of said sheet engaging means engages the end of the sheet on the platform, opposite said stopping means and a non-sheet engaging position; and
   wherein said first, second, third and fourth reciprocating means cooperatively function to first move said first, second, and third tables, respectively into their said sheet engaging position, to position the sheet into the predetermined location, and to secondly move said first, second, and third tables, respectively, into their said non-sheet engaging position to provide clearance for the sheet to be manipulated.

2. The apparatus as set forth in claim 1, wherein said sheet engaging means are upright pins.

3. The apparatus as set forth in claim 1, further including means for positioning said stopping means in one of a plurality of positions, wherein said stopping means and said holes of said first, second, and third tables are collectively arranged to facilitate reception of said sheet engaging means in a collective configuration to position the sheet located in the sheet pick-up station into the predetermined location, wherein the predetermined location of the sheet is the location where a prespecified point of the sheet is in a substantially fixed relationship to a substantially fixed reference point, regardless of the shape and/or size of the sheet.

4. The apparatus as set forth in claim 3, wherein it further includes energizing means responsive to the presence of the sheet in the sheet pick-up station for acting on the first, second, third and fourth reciprocating means to move said first and second reciprocating means toward each other to move said first and second tables into their said sheet engaging position, and to first move said third reciprocating means to move said third table into said second position and to then move said fourth reciprocating means toward said stopping means to move said third table into its said sheet engaging position, to position the sheet into the predetermined location.

5. The apparatus as set forth in claim 4, wherein said first, second, third and fourth reciprocating means are mounted to the platform, in a manner such as to provide clearance for overhead manipulation of the sheet.

6. The apparatus as set forth in claim 5, wherein the platform is a moving conveyor, and wherein the sheet moves on the conveyor along a sheet movement path toward the pick-up station.

7. The apparatus as set forth in claim 6, wherein said energizing means further includes means responsive to the presence of the sheet in the sheet pick-up station for stopping the conveyor at a predetermined time after said stopping means has stopped the sheet in the pick-up station.

8. The apparatus as set forth in claim 7, wherein the sheet is a glass sheet.

* * * * *

UNITED STATES PATENT AND TRADEMARK OFFICE
CERTIFICATE OF CORRECTION

PATENT NO. : 4,493,412

DATED : January 15, 1985

INVENTOR(S) : Richard J. Krehnovi

It is certified that error appears in the above-identified patent and that said Letters Patent are hereby corrected as shown below:

In column 7, line 44, Claim 1, "said said" should read --said--.

Signed and Sealed this

Thirteenth Day of August 1985

[SEAL]

*Attest:*

DONALD J. QUIGG

*Attesting Officer*     *Acting Commissioner of Patents and Trademarks*